United States Patent
Post et al.

(10) Patent No.: US 6,715,731 B1
(45) Date of Patent: Apr. 6, 2004

(54) PIEZOELECTRIC VALVE

(75) Inventors: Peter Post, Ostfidern-Nellingen (DE); Jürgen Gerhartz, Esslingen (DE); Reiner Bindig, Bindlach (DE)

(73) Assignee: Festo AG & Co., Esslingen (DE)

( * ) Notice: Subject to any disclaimer, the term of this patent is extended or adjusted under 35 U.S.C. 154(b) by 174 days.

(21) Appl. No.: 10/030,394

(22) PCT Filed: Jul. 1, 2000

(86) PCT No.: PCT/EP00/06154
§ 371 (c)(1),
(2), (4) Date: Apr. 24, 2002

(87) PCT Pub. No.: WO01/04526
PCT Pub. Date: Jan. 18, 2001

(30) Foreign Application Priority Data

Jul. 9, 1999 (DE) .......................................... 199 31 990

(51) Int. Cl.⁷ .............................................. F16K 31/02
(52) U.S. Cl. .................. 251/129.06; 310/332; 137/554
(58) Field of Search .............................. 251/11, 129.01, 251/129.06; 310/331, 332; 137/554

(56) References Cited

U.S. PATENT DOCUMENTS

| | | | | |
|---|---|---|---|---|
| 3,524,474 A | * | 8/1970 | McCormick | 310/332 X |
| 4,340,083 A | * | 7/1982 | Cummins | 251/129.06 X |
| 4,617,952 A | * | 10/1986 | Fujiwara et al. | 251/129.06 X |
| 4,903,732 A | * | 2/1990 | Allen | 251/129.06 X |
| 5,328,149 A | * | 7/1994 | Reuter | 251/129.06 |
| 5,343,894 A | * | 9/1994 | Frisch et al. | 251/129.06 X |
| 5,381,817 A | * | 1/1995 | Gassman et al. | 251/129.06 X |
| 5,566,703 A | * | 10/1996 | Watanabe et al. | 251/129.06 X |
| 5,628,411 A | * | 5/1997 | Mills et al. | 251/129.06 X |
| 5,669,416 A | * | 9/1997 | Nusche | 251/129.06 X |
| 5,779,218 A | * | 7/1998 | Kowanz | 251/129.06 |
| 6,017,016 A | * | 1/2000 | Jackson | 251/129.06 |
| 6,164,621 A | * | 12/2000 | Bouchard et al. | 251/129.06 |

FOREIGN PATENT DOCUMENTS

| | | |
|---|---|---|
| DE | 39 35 474 A1 | 3/1991 |
| DE | 44 10 153 C1 | 2/1995 |
| DE | 196 44 564 A1 | 4/1998 |
| DE | 197 12 855 A1 | 10/1998 |
| DE | 197 14 045 A1 | 10/1998 |
| DE | 198 01 613 A1 | 10/1998 |
| GB | 2 185 554 A | 7/1987 |

* cited by examiner

*Primary Examiner*—Gene Mancene
*Assistant Examiner*—Eric Keasel
(74) *Attorney, Agent, or Firm*—Hoffmann & Baron, LLP

(57) ABSTRACT

A directly actuated electric valve is proposed that has a piezoelectric drive unit (3) for direct actuation of a valve member (2). The piezoelectric drive unit (3) contains, extending transverse to the displacement direction of valve member (2), at least one piezo-flexural element (8, 8'), which acts on valve member (2) at one end and is mounted stationary with respect to the housing at the other, such that its electrically induced flexural motion produces the linear displacement motion of valve member (2). Such a configuration permits very short switching times with compact dimensions.

21 Claims, 3 Drawing Sheets

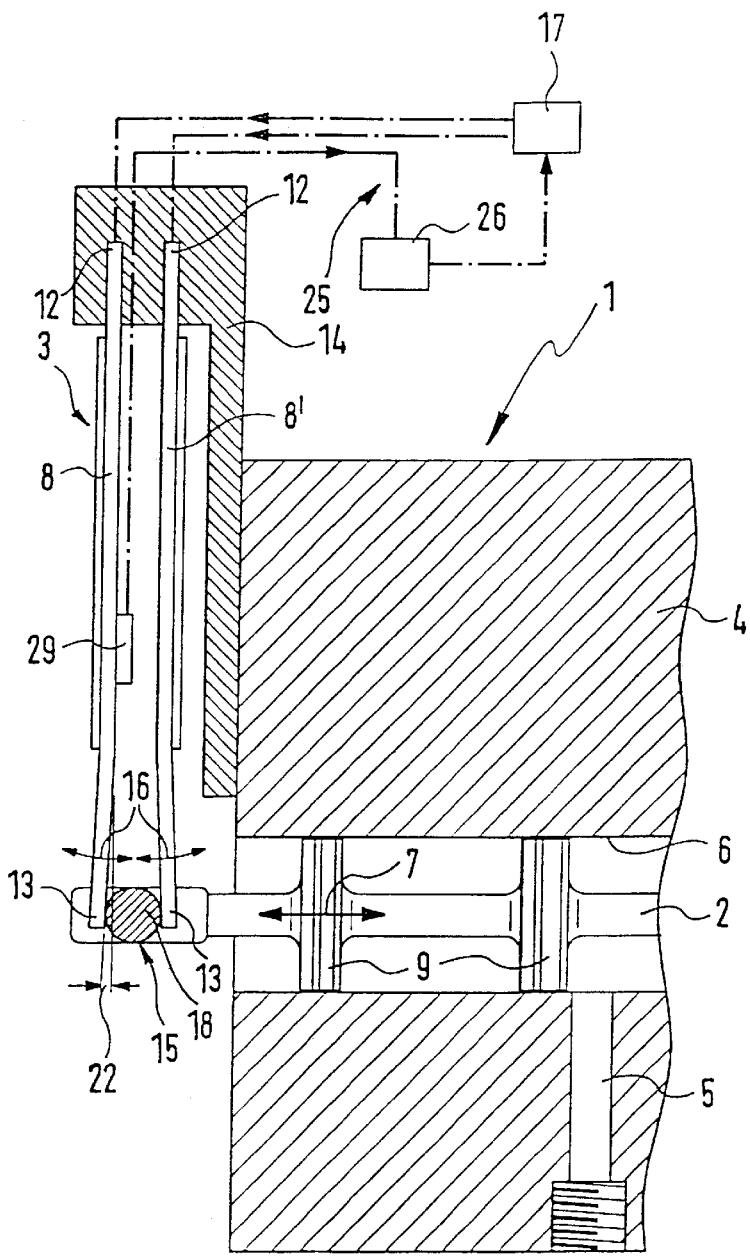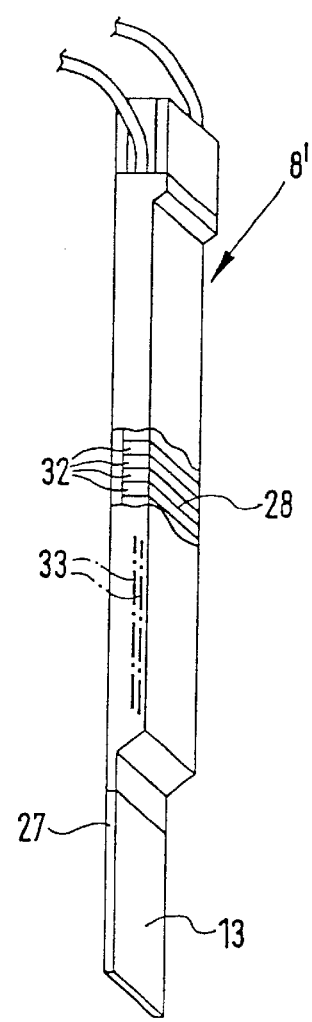
Fig. 1
Fig. 2

PIEZOELECTRIC VALVE

FIELD OF THE INVENTION

The invention pertains to an electric valve, preferably directly actuated, with a valve member with which an electrical drive unit is associated and which is guided so as to be linearly displaceable relative to a valve housing.

BACKGROUND OF THE INVENTION

Such valves are widely disseminated in the form of so-called solenoid valves. Their drive unit contains as a rule an electromagnet which drives an armature constituting the valve member. The valve member is guided displaceably in a valve housing, where the valve housing can be formed at least in part by the housing of the electromagnet.

Known electric valves have the disadvantage that the technological barriers to miniaturization are relatively high. Moreover, the operation of solenoid valves is ordinarily associated with relatively high power consumption, which results in the strong generation of heat. Not least of all, electromagnetic drive units reach their limits relatively soon in connection with the realization of high switching speeds. The problem of the present invention is to create a directly actuated, i.e., a non-piloted electric valve of the initially mentioned type that permits smaller overall sizes and higher switching speeds with reduced power consumption.

OBJECTS AND SUMMARY OF THE INVENTION

To solve this problem, the drive unit is implemented as a piezoelectric drive unit which contains at least one piezo-flexural element extending transversely to the displacement direction of the valve member which acts on the valve member at one end and is held stationary with respect to the housing at the other such that its electrically induced flexing motion produces the linear displacement motion of the valve member.

In this way, the flexural behavior of a piezo-flexural element constructed as a piezoconverter is exploited to produce the actuation of a valve member, a direct actuation preferably being provided. This permits previously unattained reductions in the overall size of the valve, it also being possible for the overall length of the valve to be kept very compact because of the transverse arrangement of the existing piezo-flexural element. The piezoelectric drive unit additionally allows high-frequency valve actuation, on the order of, for instance, 200 Hz, so that considerably shorter switching times can be achieved. It is thus possible overall to switch more quickly with better performance data and smaller overall volumes. Furthermore, with a higher efficiency than for solenoid valves, there is lower thermal load.

To be sure, piezo valves, as they are called, are known, for instance, from DE 198 01 613 A1. In these the piezo-flexural element has thus far always been used directly as a valve member and not as a valve drive unit driving a displaceably guided valve member by mechanical coupling.

Advantageous refinements of the invention are derived from the subordinate claims.

The valve member is expediently a valve slide in, for instance, the constructive form of a piston slide valve.

The drive unit of the electric valve may be equipped with only a single piezo-flexural element. If it is motively coupled appropriately to the valve member, then movements of the valve member in the opposite axial direction can also be produced with it, if desired. Additional installation of a restoring unit, such as a spring device opposing the actuation force of the piezo-flexural element, would also be conceivable.

Considered much more advantageous, however, is an embodiment in which the piezoelectric drive device has several piezo-flexural elements acting on the valve member. If these are piezo-flexural elements with identically oriented force action, then elevated actuating forces can be achieved. A constructive form, however, in which two piezo-flexural elements that can act on the valve member with oppositely oriented actuating forces are present is considered particularly expedient. Among other things, a piezoelectrically actuated operating motion of the valve member in both directions can be achieved in this way. Particularly in this context, it is advantageous if a control unit is present that permits a mutually matched electrical triggering of the piezo-flexural elements with variable voltages, in order to achieve different actuation paths or positions as a function of the applied voltage values. For instance, a voltage-gradated triggering of the piezo-flexural elements would be possible here to achieve a multiposition behavior of the valve member. With infinitely variable triggering, on the other hand, a continuous motion behavior and accordingly an electric valve constructed as a continuous valve can be achieved.

It would be possible to position two piezoelements such that they interact with opposing axial end sections of the valve member. Reduced construction expense for design is promised, however, by an embodiment in which two piezo-flexural elements acting on the valve member are arranged adjacent to one another and act on one and the same end section of the valve member.

Especially if the valve member is acted on by two piezoelements with opposite directions of force, it is advantageous if at least one piezoelement, and preferably both, act under an initial mechanical tension on the valve member such that the piezo-flexural elements are deflected at least in part out of their neutral position. This promises a play-free transmission of force onto the valve member by simple means, even in cases in which the piezo-flexural element interacts exclusively by tangential contact with the valve member. Thus switching motions can be implemented with high precision.

In order to be able to integrate the electric valve into an electronic control unit, it is advantageous if a position-detecting device is present, with which at least one position, but preferably every instantaneous position, of the valve member can be determined. Such a position-detection device expediently obtains the necessary information on the basis of the current bending state of at least one piezo-flexural element, which is expediently detected by the use of at least one elongation-measurement strip placed on the piezo-flexural element.

In an advantageous construction, the piezo-flexural elements have an elongated, strip-like support which is coated on at least one side, that is, on one of its two larger surfaces with piezoelectric material, wherein, in particular, a multi-layer coating finds use. The individual layer planes could run parallel to the extension plane of the support here; however, an implementation with layer planes oriented transversely to the longitudinal direction of the support, so that the piezo-electric material can be constructed from a strip-like piezo stack, appears particularly advantageous.

The invention will be explained below in greater detail on the basis of the attached drawings.

BRIEF DESCRIPTION OF THE DRAWINGS

FIG. 1, an axial end section of a first constructive form of the electric valve according to the invention in highly schematized representation and in a longitudinal section;

FIG. 2, in a perspective detail illustration, a piezo-flexural element preferably finding use in the electric valve of FIG. 1;

DETAILED DESCRIPTION OF THE PREFERRED EMBODIMENTS

Figure 3:
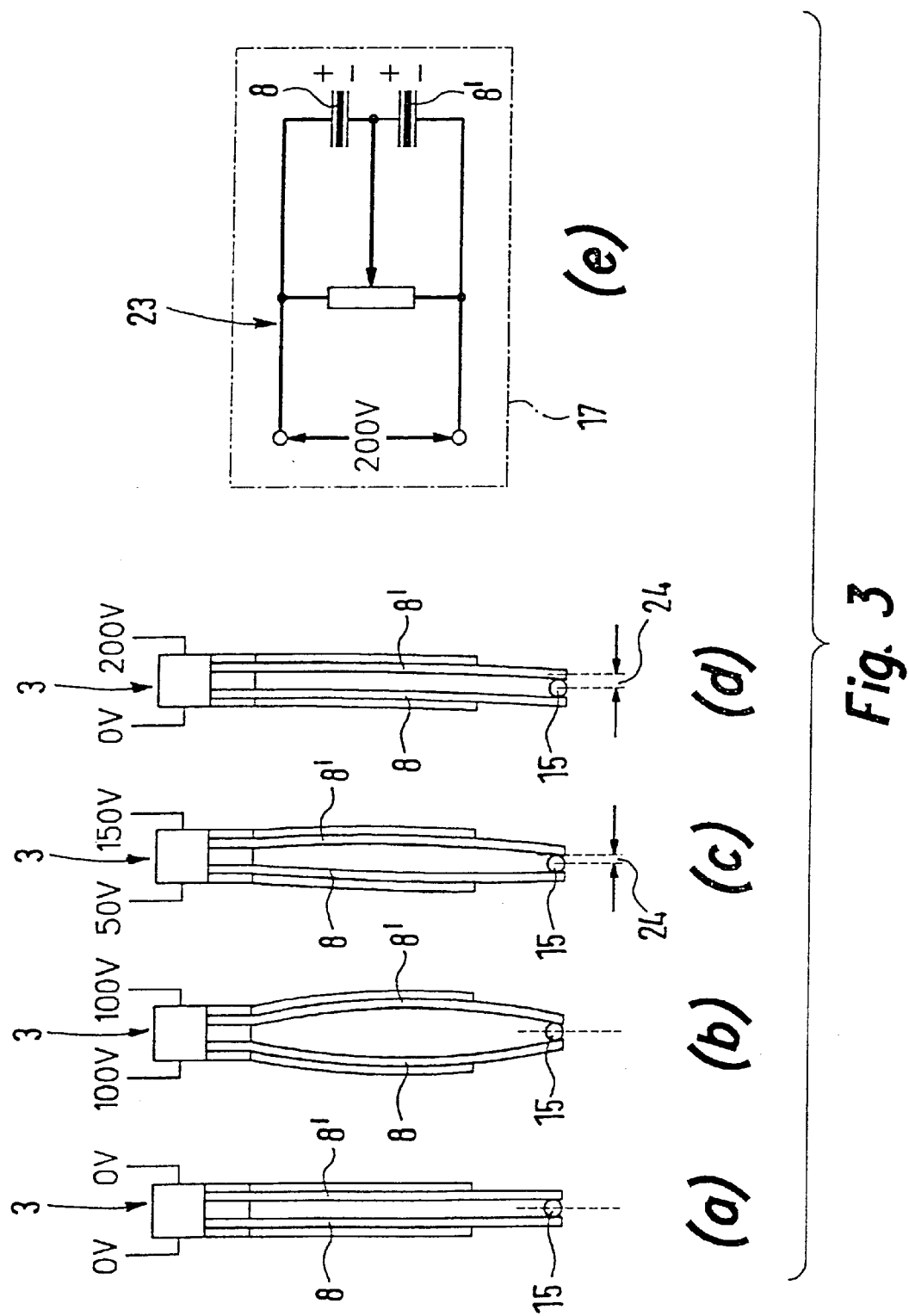
FIG. 3, in drawings (a)–(d), different actuation phases of the piezoelectric drive unit finding use in the electric valve of FIG. 1, drawing (e) reproducing a control circuit particularly suited for the implementation of these actuation phases.

FIG. 1 shows, depicted in longitudinal section, an end section of a directly actuated electric valve 1, that is, a valve whose valve member 2 is actuated directly by an electrically activatable drive unit 3 with fluid piloting.

Electric valve 1 has a valve housing 4 that is penetrated by number of valve channels 5 depending on the valve type and contains an elongated receptacle 6, contoured cylindrically in the embodiment, and in which valve member 2 is guided so as to be linearly displaceable.

The only partially visible valve channels 5 open into receptacle 6. As a function of the instantaneous position of valve member 2 they are fluidically linked in a mutually adapted manner so that, for instance, the functionality of a 3/2 valve or a valve with a higher functionality results.

Figures 4, 5:
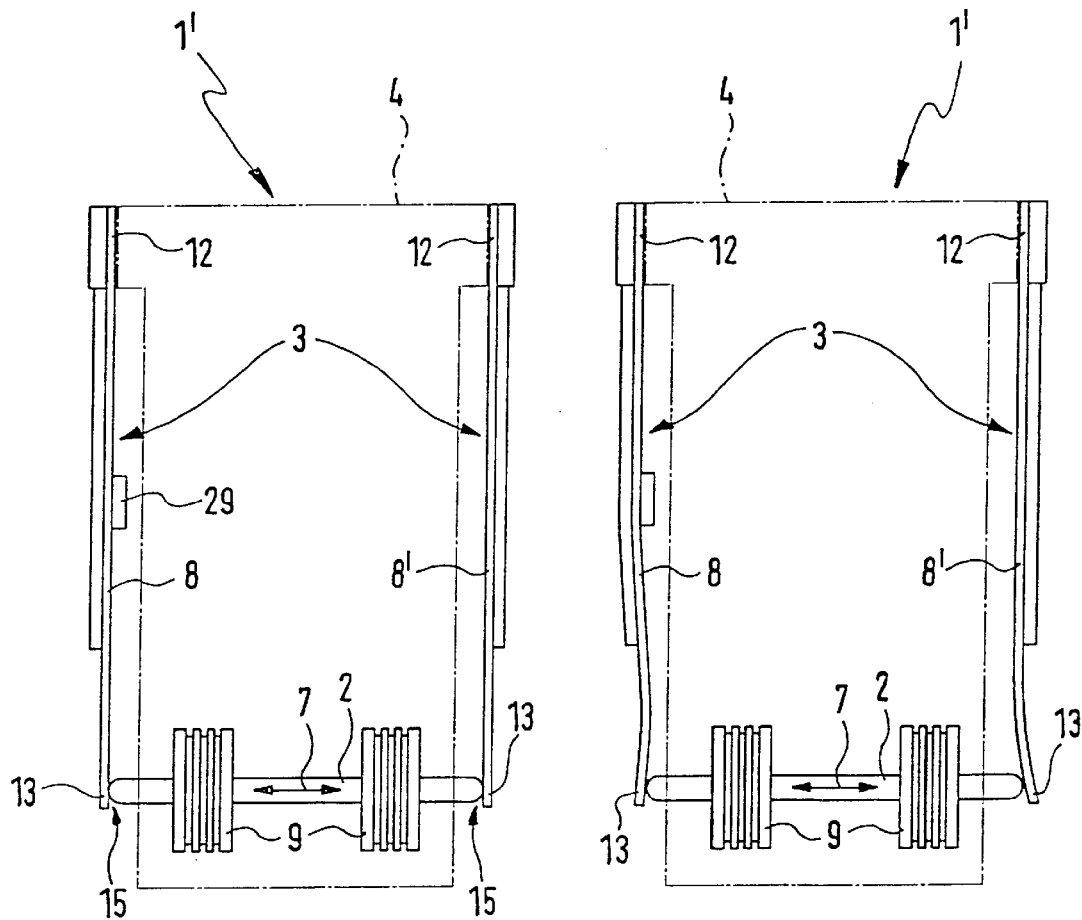
FIG. 4, in highly schematized representation, an additional electric valve of a construction according to the invention wherein, however, in comparison to the embodiment of FIGS. 1–3, the piezo-flexural elements of the drive unit interact with both end sections of the valve member and where a nondeflected neutral position is shown, and FIG. 5, the electric valve from FIG. 4 with an activated drive unit with a correspondingly deflected valve member.

In the additional embodiment of an electric valve 1' shown in FIGS. 4 and 5, identical components are provided with the same reference numerals. Valve housing 4 is indicated there only in dot-dash lines.

In both electric valves 1, 1' valve member 2 is implemented as a valve slide which has longitudinal sections of differing diameters, so that control sections 9 result, which are in occlusive contact with the wall of receptacle 6. Electric valve could, of course, also be a seat valve.

The drive unit 3 is implemented as a piezoelectric drive unit. In each of the embodiments shown, it contains, extending transverse to the displacement direction 7 of valve member 2 as indicated by double arrows, two piezo-flexural elements 8, 8'. The latter are mounted stationary with respect to valve housing 4 at one axial end, hereinafter called the fastening end 12, and with their other, opposite end, hereinafter called the actuating end 13, they act on valve member 2.

The fixed mounting with respect to the housing can be done directly as in FIGS. 4 and 5. Preferably, however, there is an indirect mounting as in, for instance, FIG. 1, with the intercalation of a holder 14 to which the fastening ends 12 are clamped and which is in turn fastened to valve housing 4.

Piezo-flexural elements 8, 8' can have a conventional structure, so that their activation by application of an electric potential results in a pivoting motion schematically indicated by double arrows in FIG. 1, caused by a warping of piezo-flexural elements 8, 8' and therefore referred to as flexural motion 16. In essence, the activation of piezo-flexural elements 8, 8' has the result that they carry out a type of pivoting motion with respect to fixed fastening ends 12 with their actuation ends 13, the plane of this pivoting motion coinciding with the drawing plane in the embodiments serving as examples and oriented parallel to the linear displacement direction 7 of valve member 2.

A control unit 17 suitable for the electrical triggering of piezo-flexural elements 8, 8' is provided. It is expediently designed such that it can electrically trigger the existing piezo-flexural elements individually, independently of one another.

Each piezo-flexural element 8, 8' is motively coupled with valve member 2 in the area of a coupling site 15 provided thereon such that the electrically induced flexural motion 16 of a respective piezo-flexural element 8, 8' produces a linear displacement motion of valve member 2 in the already defined displacement direction 7.

In order to guarantee the cooperating components here the necessary degrees of freedom of motion, an interaction between piezo-flexural elements 8, 8' and valve member 2 based exclusively on tangential contact is provided in the embodiments. The entire arrangement is expediently such that piezo-flexural elements 8, 8' act under initial mechanical tension on valve member 2.

In detail, the two piezo-flexural elements 8, 8' are constructed and installed such that they can act on valve member 2 with oppositely oriented actuating forces. In this way, one piezo-flexural element 8, 8' is responsible for moving valve member 2 in each of the two axial displacement directions.

In the embodiment of FIGS. 1–3, the two piezo-flexural elements 8, 8' are combined compactly in the narrowest space possible. The are situated longitudinally adjacent to one another and placed one after the other relative to displacement direction 7. Their actuating ends 13 act at the coupling site 15 on axially opposing sides, in relation to the displacement direction 7, of a transfer member 18 provided on valve member 2. In other words, transfer member 18 having, for instance, a ridge-like shape is situated between the two actuating ends 13, a play-free clamping in displacement direction 7 being assured by the aforementioned initial mechanical tensioning of piezo-flexural elements 8, 8'.

Due to the initial mechanical tensioning, piezo-flexural elements 8, 8' have, in comparison to the neutral state, an angular excursion in the area of their actuating ends 13 that is shown somewhat exaggeratedly in FIG. 1 and is opposite to the respective displacement direction of valve member 2 they bring about. This excursion is visible at position 22 in FIG. 1.

An action of piezo-flexural elements 8, 8' on valve member 2 taking place under initial tension can also be provided for the embodiment of FIGS. 4 and 5. In any case an arrangement was made there that the two piezo-flexural elements 8, 8' have a greater distance from one another and each acts on one of the two axial end sections of valve member 2. For this purpose, they are placed in the area of the two opposite end sections of valve housing 4, while they are installed together in the area of one housing end according to FIG. 1. According to FIGS. 4 and 5, valve member 2 thus extends between the two piezo-flexural elements 8, 8', between which it is also clamped free of play.

During their activation, piezo-flexural elements 8, 8' can run or slide along valve member 2 in the area where they contact it, so that mechanical distortions are avoided. It is understood here that a material connection can be provided between piezo-flexural elements 8, 8' and valve member 2, if needed, by interposing articulation or hinge means, for instance.

Piezoelectric drive unit 3 could also be equipped with only one piezo-flexural element which is then responsible for the generation of the switching motion of valve member 2 in only one displacement direction. Suitable restoring means such as a pneumatic or fluidic spring device or a sufficient resilience of the piezo-flexural element itself could produce the restoring movement with a deactivated piezo-flexural element. It would also be conceivable to design the piezo-flexural element with an appropriate construction such that it is actively deflectable in two pivot directions in order thereby to produce the actuating movement of valve member 2 with one and the same piezo-flexural element.

In an embodiment which is likewise not illustrated, drive unit 3 is equipped with more than two piezo-flexural elements. As is also the case, incidentally, with a double arrangement of piezo-flexural elements, such a constructive form could be used to achieve an addition of piezo-actuating forces and thus an amplification of force.

With all embodiments it is possible to achieve a continuous actuation characteristic of valve member 2 by infinitely variable specification of the voltages applied to piezo-flexural elements 8, 8'. In this manner, the electric valve is suited for uses in which the fluid to be controlled, in particular, compressed air, is to be fed to a load at a variable flow rate. A particularly expedient field of use is proportional valve technology.

It becomes clear on the basis of FIG. 3 that it is certainly possible by means of piezoelectric drive unit 3 to achieve a digital multiposition behavior of valve member 2, where valve member 2 is positioned in very definite actuation positions by traveling specified actuation path. This takes place here by a gradated-voltage triggering of the piezo-flexural element pair 8, 8', the actuation forces of the two piezo-flexural elements 8, 8' influencing one another such that a resultant actuation path, resulting from the superimposition of the flexural motions of the two piezo-flexural elements 8, 8' can be picked off in the sum at coupling site 15 or transfer member 18.

FIG. 3(e) shows a control circuit 23 which is expediently integrated into the control unit 17 and is constructed as a voltage divider circuit, wherein an applied output voltage—200 V in the embodiment—is distributed in a predetermined ratio to the two piezo-flexural elements 8, 8', depending on the setting. Possible effects of given voltage divisions are illustrated in diagrams (a)–(d) of FIG. 3.

FIG. 3(a) shows the two piezo-flexural elements 8, 8' in their deactivated neutral position, i.e., their de-energized zero point. This neutral position consequently also exists in case of a power failure, so that it can be used to implement a desired fail-safe function.

FIG. 3(b) shows an equal division of the output voltage to the two piezo-flexural elements 8, 8'. In this case the piezoconverter forces acting on valve member 2 at coupling point 15 cancel each other out, in which case the piezo-flexural elements 8, 8' do indeed curve outwards, but as a whole do not produce any displacement of valve member 2.

FIG. 3(c) shows a state in which, by the appropriate commands from the control circuit 23, a voltage of 150 V is present at one piezo-flexural element 8' and a voltage of 50 V at the other piezo-flexural element 8. Thus, an excursion of coupling point 15 results and correspondingly, an actuation path 24 of valve member 2, which amounts in the present case to half the maximum possible actuation path.

FIG. 3(d), finally, shows a triggering state in which the entire output voltage of 200 V is applied to one piezo-flexural element 8', while no voltage is applied to the other piezo-flexural element 8. In this case, the maximum possible actuation path 24 results at the coupling point 15 and correspondingly on the valve member 2 connected to it.

By coordinated electrical triggering of the two piezo-flexural elements 8, 8', therefore, it is possible to produce varying actuation paths and/or actuation positions of valve member 2.

A particular advantage of the piezoelectric activation of electric valve 1, 1' is that high-frequency valve actuation is possible, on the order of, for instance, 200 Hz, so that extremely short switching times can be achieved.

A position-detection device 25 can be provided in order to detect one or more positions, and preferably, every instantaneous position of valve member 2. The constructive form implemented in the embodiment provides position detection on the basis of the current flexural state of at least one piezo-flexural element 8 of piezoelectric drive unit 3.

To this end, the respective piezo-flexural element 8 can be equipped in accordance with the drawing with at least one elongation-measuring strip 29, the elongation state of which depends on the bending angle of piezo-flexural element 8 and which is consequently capable of producing position signals, which are evaluated in an evaluation unit 26. The latter can be constructed separately, as shown, or can also be a constituent part of control unit 17.

In place of elongation-measuring strip 29, other suitable sensors can also be used. It would also be possible to equip several and, expediently, each piezo-flexural element 8, 8' present with a corresponding sensor system.

Another possible embodiment of a piezo-flexural element 8', which can advantageously be used in piezoelectric drive unit 3, is shown in FIG. 2. It has a strip-like elongated support 27, preferably of ceramic material and/or metal, which is coated on one of its two side surfaces of larger area with piezoelectric material 28. This piezoelectric material 28 expediently has a multilayer structure with several superimposed piezo layers 32.

In the embodiment, there is a stratification following the longitudinal axis of the support, so that the layer planes of the individual piezo layers 32 run transverse to the longitudinal direction of support 27 and, in particular, this longitudinal direction is oriented at a right angle to the individual layer planes. The piezoelectric material 28 thereby receives a structure comparable to a piezoelectric stack translator, wherein the individual piezo layers are correspondingly contacted. The application of a voltage leads to a change in length of the piezo stack and, resulting therefrom, to a curvature of support 27, the front end of which constitutes the actuating end 13.

The piezoelectric material 28 expediently covers only part of the length of support 27. Other embodiments are also possible, however. Thus, the support can be evenly covered with active piezo material (multilayer of piezo and electrode material) or with passive piezo material (piezo material without electrodes). This reduces the notch effect between piezo material and support, connected with an increase of service life.

In a modified constructive form, the piezoelectric material 28 is constructed comparably to a strip translator, wherein the piezo layers 33 for such a structure, which are indicated by dot-dash lines in FIG. 2 can run in the longitudinal direction of support 27 with layer planes parallel to the support plane.

As the support material, it is advantageous to use a high-strength ceramic, such as aluminum oxide, zirconium oxide or silicon nitride. The piezo material already formed in strip shape is glued onto the support material, without insulation problems arising. If a metal is used as the support material, then a thin insulator of, for instance, polyamide is necessary between metal support and piezo material.

It has proven advantageous to operate the piezo-flexural element, not at the point of maximum excursion, but at the point of maximum electromechanical efficiency. This may be set in the conventional manner by matching the modulus of elasticity and thickness of the support and of the piezoelectric coating.

If an elongation-measuring strip 29 is used for position detection, it would expediently be placed on the second larger-surface side of carrier 27 facing away from piezoelectric material 28.

What is claimed is:

1. An electric valve with a valve member guided so as to be linearly displaceable relative to a valve housing and with which an electrically activatable piezoelectric drive unit is associated, that contains, extending transverse to the displacement direction of the valve member, at least one piezo-flexural element, which acts on said valve member at one end and is mounted stationary with respect to the housing at the other, such that the piezo-flexural element's electrically induced flexural motion produces the linear displacement motion of valve member, wherein the piezoelectric drive unit has several piezo-flexural elements acting on the valve member, wherein at least two piezo-flexural elements are provided that can act on the valve member with actuation forces that are oriented in opposite directions.

2. An electric valve according to claim 1, wherein the valve member is formed of a valve slide.

3. An electric valve according to claim 1, wherein different piezo-flexural elements can be individually triggered electrically.

4. An electric valve according to claim 1, wherein two piezo-flexural elements act on the two opposite axial end sections of the valve member.

5. An electric valve according to claim 1, wherein the electric valve is a continuous valve.

6. An electric valve according to claim 1, wherein at least one piezo-flexural element interacts with the valve member exclusively by tangential contact.

7. An electric valve according to claim 1, further comprising a control unit for coordinated electrical triggering of the piezo-flexural elements with variable voltages for the production of differing actuation positions of the valve member.

8. An electric valve according to claim 7, wherein the control unit permits a voltage-gradated triggering of the piezo-flexural elements in order to achieve multipositional behavior of the valve member.

9. An electric valve according to claim 1, wherein at least one piezo-flexural element acts under initial mechanical tension on the valve member.

10. An electric valve according to claim 9, wherein two oppositely acting piezo-flexural elements act simultaneously under initial mechanical tension on the valve member.

11. An electric valve according to claim 1, further comprising a position-detecting device for detecting the position of the valve member on the basis of the current bending state of at least one piezo-flexural element.

12. An electric valve according to claim 11, wherein at least one piezo-flexural element is equipped with at least one elongation-measuring strip for detecting its bending state.

13. An electric valve according to claim 1, wherein two piezo-flexural elements acting on the valve member are arranged adjacent to one another.

14. An electric valve according to claim 13, wherein the two piezo-flexural elements arranged adjacent one another act jointly on one of the two axial end sections of valve member.

15. An electric valve according to claim 13, wherein the two piezo-flexural elements arranged adjacent to one another are jointly assigned to one of the two axial end areas of the valve housing.

16. An electric valve according to claim 1, wherein at least one piezo-flexural element has an elongated strip-like support which is coated on at least one side with piezoelectric material.

17. An electric valve according to claim 16, wherein the piezoelectric material is glued onto the support.

18. An electric valve according to claim 16, wherein the support comprises a high-strength ceramic material.

19. An electric valve according to claim 16, wherein the modulus of elasticity and the thickness of the support and of the piezoelectric material are matched to one another such that the electromechanical efficiency of piezo-flexural element is at the maximum.

20. An electric valve according to claim 16, wherein the piezoelectric material has a multilayer structure.

21. An electric valve according to claim 20, wherein the layer planes of piezoelectric material run in the longitudinal direction of the support.

* * * * *